(12) United States Patent
Xiao et al.

(10) Patent No.: US 12,438,745 B2
(45) Date of Patent: Oct. 7, 2025

(54) ACCESS CONTROL METHOD AND APPARATUS

(71) Applicant: HUAWEI TECHNOLOGIES CO., LTD., Shenzhen (CN)

(72) Inventors: Yating Xiao, Beijing (CN); Qianqian Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 18/170,694

(22) Filed: Feb. 17, 2023

(65) Prior Publication Data

US 2023/0198796 A1  Jun. 22, 2023

Related U.S. Application Data

(63) Continuation of application No. PCT/CN2021/112662, filed on Aug. 16, 2021.

(30) Foreign Application Priority Data

Aug. 19, 2020 (CN) .......................... 202010837047.9

(51) Int. Cl.
*H04L 12/66* (2006.01)
*H04L 12/28* (2006.01)
*H04L 61/5007* (2022.01)

(52) U.S. Cl.
CPC .......... *H04L 12/2869* (2013.01); *H04L 12/66* (2013.01); *H04L 61/5007* (2022.05)

(58) Field of Classification Search
CPC .... H04W 88/16; H04W 88/12; H04L 12/287; H04L 12/2801; H04L 12/2869;
(Continued)

(56) References Cited

U.S. PATENT DOCUMENTS

2010/0274924 A1* 10/2010 Allan .................. H04L 61/5014
709/245
2014/0071811 A1* 3/2014 Niu ..................... H04L 41/0654
370/221

FOREIGN PATENT DOCUMENTS

EP 3493508 A1 6/2019
EP 4207842 A1 7/2023
(Continued)

OTHER PUBLICATIONS

"IEEE Draft Standard for Local and metropolitan area networks—Port-Based Network Access Control," in IEEE P802.1X/D1.5, Sep. 2019, vol. No., pp. 1-288, Oct. 15, 2019. (Year: 2019).*

(Continued)

*Primary Examiner* — Messeret F Gebre
(74) *Attorney, Agent, or Firm* — Maier & Maier, PLLC (57) ABSTRACT

An access control method. A BNG CP may receive a first message from first user equipment. The first message is used by the first user equipment to request to access a network, a primary gateway through which the first user equipment accesses the network is a first BNG, and a backup gateway through which the first user equipment accesses the network is a second BNG. After receiving the first message, the BNG CP may determine, from a first network segment, an IP address assigned to the first user equipment, and send the IP address of the first user equipment to the first user equipment. The first network segment is only used to assign an IP address to user equipment that accesses the network by using the first BNG as a primary gateway and the second BNG as a backup gateway.

17 Claims, 4 Drawing Sheets

(58) Field of Classification Search
CPC ..... H04L 12/66; H04L 61/5007; H04L 45/22; H04L 61/503; H04L 45/74; H04L 12/2858
See application file for complete search history.

(56) References Cited

FOREIGN PATENT DOCUMENTS

| | | |
|---|---|---|
| WO | 2013159549 A1 | 10/2013 |
| WO | WO-2019042379 A1 * | 3/2019 ......... H04L 43/0882 |

OTHER PUBLICATIONS

Y. Ashibani, D. Kauling and Q. H. Mahmoud, "A context-aware authentication service for smart homes," 2017 14th IEEE Annual Consumer Communications & Networking Conference (CCNC), Las Vegas, NV, USA, 2017, pp. 588-589, (Year: 2017).*

Cohen et al., "Migration to Ethernet-Based DSL Aggregation", Architecture and Transport Working Group, Digital Subscriber Line Forum, TR-101, Apr. 2006, 101 pages.

Karagiannis et al., "Cloud Central Office Reference Architectural Framework", Broadband Forum, TR-384, Jan. 2018, 80 pages.

* cited by examiner

ACCESS CONTROL METHOD AND APPARATUS

CROSS-REFERENCE TO RELATED APPLICATIONS

This application is a continuation of International Application No. PCT/CN2021/112662, filed on Aug. 16, 2021, which claims priority to Chinese Patent Application No. 202010837047.9, filed on Aug. 19, 2020. The disclosures of the aforementioned applications are hereby incorporated by reference in their entireties.

TECHNICAL FIELD

The embodiments relate to the communication field and an access control method and apparatus.

BACKGROUND

User equipment may access a network through a gateway, for example, a broadband network gateway (BNG). In some scenarios, user equipment may access a network through two gateways, one gateway being a primary gateway, and the other gateway being a backup gateway. When the primary gateway is available, the user equipment accesses the network through the primary gateway. When the primary gateway is unavailable, the user equipment accesses the network through the backup gateway.

When multiple user equipments all correspond to two identical gateways that are in a primary and backup relation, the primary gateways corresponding to the user equipments may not be all the same. For example, for a first gateway and a second gateway that are in a primary and backup relation, the primary gateway of a first user is the first gateway, the backup gateway of the first user is the second gateway, the primary gateway of a second user is the second gateway, and the backup gateway of the second user is the first gateway. In this case, a network resource of one of the gateways may be improperly occupied.

SUMMARY

The embodiments may provide an access control method, to prevent a network resource of a gateway from being improperly occupied.

According to a first aspect, an embodiment may provide an access control method. The method may be performed by a BNG CP. In an example, the BNG CP may receive a first message from first user equipment, where the first message is used by the first user equipment to request to access a network, a primary gateway through which the first user equipment accesses the network is a first BNG, and a backup gateway through which the first user equipment accesses the network is a second BNG. After receiving the first message, the BNG CP may determine, from a first network segment, an IP address assigned to the first user equipment, and send the IP address of the first user equipment to the first user equipment. In the embodiments, the first network segment is only used to assign an IP address to user equipment that accesses the network by using the first BNG as a primary gateway and the second BNG as a backup gateway. In other words, the first network segment is not used to assign an IP address to user equipment that accesses the network by using the first BNG as a backup gateway and the second BNG as a primary gateway. Even if the first BNG first enables the user equipment to access the network, a network resource of the first BNG may not be improperly occupied.

In an implementation, the first BNG may form a primary and backup relation with a plurality of BNGs. For example, the first BNG and the second BNG may form a primary and backup relation. For another example, the first BNG and a third BNG may also form a primary and backup relation. To avoid improper occupation of network resources of BNGs, a second network segment may be used to assign an IP address to user equipment that uses the first BNG as a primary gateway and the third BNG as a backup gateway. The first network segment is different from the second network segment. In this case, a BNG CP of the first BNG may further assign an IP address to second user equipment. In an example, the BNG CP of the first BNG may receive a second message from the second user equipment, and determine, from the second network segment, the IP address assigned to the second user equipment. After determining the IP address assigned to the second user equipment, the BNG CP of the first BNG may send the IP address of the second user equipment to the second user equipment.

In an implementation, the embodiments may be applied to a network scenario with CU separation, in other words, a CP of the first BNG runs on a device independent of the first BNG. In this case, the BNG CP that performs the access control method may be a virtual BNG CP module.

In an implementation, the embodiments may be applied to a scenario without CU separation, in other words, both the CP of the first BNG and a UP of the first BNG run on a first BNG CP. In this case, the BNG CP that performs the access control method may run on the first BNG In an implementation, when the embodiments are applied to the network scenario with CU separation, the first BNG and the second BNG may correspond to a same vBNG CP module. In this case, the vBNG CP may further assign an IP address to third user equipment. The third user equipment is user equipment that accesses the network by using the second BNG as a primary gateway and the first BNG as a backup gateway. In an example, the vBNG CP module may receive a third message from the third user equipment, and determine, from a third network segment, the IP address assigned to the third user equipment. After determining the IP address assigned to the third user equipment, the vBNG CP module may send the IP address of the third user equipment to the third user equipment.

In an implementation, the BNG CP may obtain a correspondence between a primary gateway, a backup gateway, and a network segment in advance. When receiving a message for requesting to access the network from user equipment, the BNG CP may assign an IP address to the user equipment from a corresponding network segment based on the correspondence. The correspondence may include a correspondence between the first BNG, the second BNG, and the first network segment. When the first message is received, the IP address assigned to the first user equipment may be determined from the first network segment. The correspondence may include a correspondence between the first BNG, the third BNG, and the second network segment. When the second message is received, the IP address assigned to the second user equipment may be determined from the second network segment. The correspondence may include a correspondence between the second BNG, the first BNG, and the third network segment. When the third message is received, the IP address assigned to the third user equipment may be determined from the third network segment.

In an implementation, when the embodiments are applied to the network scenario with CU separation, the BNG CP is a virtual BNG CP module. In this case, the virtual BNG CP module may send the IP address of the first user equipment to the first user equipment through the first BNG. In other words, the virtual BNG CP module may send the IP address of the first user equipment to the first BNG, and after receiving the IP address of the first user equipment, the first BNG may send the IP address of the first user equipment to the first user equipment. In addition, the first BNG may further advertise a route corresponding to the first network segment to another network device as a primary route to the first user equipment, so that the another network device sends data to the first user equipment through the route. In addition, the second BNG may advertise the route corresponding to the first network segment to the another network device as a backup route to the first user equipment.

In an implementation, when the embodiments are applied to a network scenario without CU separation, the BNG CP runs on the first BNG. In this case, the BNG CP may further advertise a route corresponding to the first network segment to another network device as a primary route to the first user equipment, so that the another network device sends data to the first user equipment through the route. The route corresponding to the first network segment is a route to the first user equipment through the first BNG.

According to a second aspect, an embodiment may provide an access control apparatus, applied to a broadband network gateway control plane BNG CP. The apparatus includes: a receiving unit, configured to receive a first message from first user equipment, where the first message is used by the first user equipment to request to access a network, a primary gateway through which the first user equipment accesses the network is a first BNG, and a backup gateway through which the first user equipment accesses the network is a second BNG; a determining unit, configured to determine, from a first network segment based on the first message, an Internet Protocol IP address assigned to the first user equipment, where the first network segment is used to assign an IP address to user equipment that accesses the network by using the first BNG as a primary gateway and the second BNG as a backup gateway; and the first network segment is not used to assign an IP address to user equipment that uses the first BNG as a backup gateway and the second BNG as a primary gateway; and a sending unit, configured to send the IP address of the first user equipment to the first user equipment.

In an implementation, the receiving unit is further configured to receive a second message from second user equipment, where the second message is used by the second user equipment to request to access the network, a primary gateway through which the second user equipment accesses the network is the first BNG; and a backup gateway through which the second user equipment accesses the network is a third BNG; the determining unit is further configured to determine, from a second network segment based on the second message, an IP address assigned to the second user equipment, where the second network segment is used to assign an IP address to user equipment that accesses the network by using the first BNG as a primary gateway and the third BNG as a backup gateway, and the first network segment is different from the second network segment; and the sending unit is further configured to send the IP address of the second user equipment to the second user equipment.

In an implementation, the BNG CP is a virtual BNG CP module, or the BNG CP runs on the first BNG.

In an implementation, when the BNG CP is the virtual BNG CP module, the receiving unit is further configured to receive a third message from third user equipment, where the third message is used by the third user equipment to request to access the network; a primary BNG through which the third user equipment accesses the network is the second BNG, and a backup BNG through which the third user equipment accesses the network is the first BNG; the determining unit is further configured to determine, from a third network segment based on the third message, an IP address assigned to the third user equipment, where the third network segment is used to assign an IP address to user equipment that accesses the network by using the second BNG as a primary gateway and the first BNG as a backup gateway, the first network segment, the second network segment, and the third network segment are different from each other, and the second network segment is used to assign an IP address to user equipment that accesses the network by using the first BNG as a primary gateway and the third BNG as a backup gateway; and the sending unit is further configured to send the IP address of the third user equipment to the third user equipment.

In an implementation, the apparatus further includes: an obtaining unit is configured to obtain a correspondence between a primary gateway, a backup gateway, and a network segment, where the correspondence includes one or more of the following: a correspondence between the first BNG, the second BNG, and the first network segment; and a correspondence between the first BNG, the third BNG, and the second network segment; and a correspondence between the second BNG, the first BNG, and the third network segment.

In an implementation, when the BNG CP is the virtual BNG CP module, the sending unit is configured to: send the IP address of the first user equipment to the first user equipment through the first BNG.

In an implementation, when the BNG CP runs on the first BNG, the sending unit is further configured to: advertise a route corresponding to the first network segment to another network device as a primary route to the first user equipment, where the route corresponding to the first network segment is a route to the first user equipment through the first BNG.

According to a third aspect, an embodiment may provide a device. The device includes a processor and a memory. The memory is configured to store instructions or a computer program. The processor is configured to execute the instructions or the computer program in the memory, to perform the method according to any implementation of the first aspect.

According to a fourth aspect, an embodiment may provide a non-transitory computer-readable storage medium, including instructions and a computer program. When the non-transitory computer-readable storage medium runs on a computer, the computer is enabled to perform the method according to any implementation of the first aspect.

According to a fifth aspect, an embodiment may provide a computer program product, including instructions and a computer program. When the computer program product runs on a computer, the computer is enabled to perform the method according to any implementation of the first aspect.

BRIEF DESCRIPTION OF THE DRAWINGS

To describe the embodiments or in the conventional technology more clearly, the following briefly describes the accompanying drawings. It is clear that the accompanying drawings in the following descriptions show some embodiments, and a person of ordinary skill in the art may still derive other drawings from these accompanying drawings without creative efforts.

DETAILED DESCRIPTION OF THE EMBODIMENTS

The embodiments may provide an access control method, to prevent a network resource of a gateway from being improperly occupied.

For ease of understanding, possible embodiments are described first.

Figure 1:
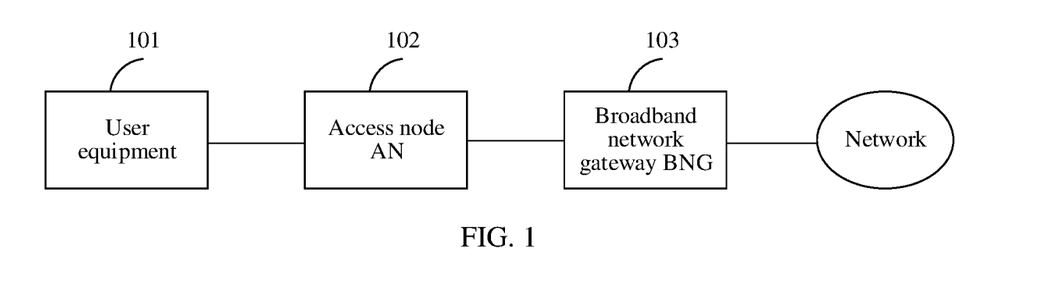
FIG. 1 is a schematic diagram of an example application scenario according to an embodiment.

FIG. 1 is a schematic diagram of an example application scenario according to an embodiment.

In the scenario shown in FIG. 1, user equipment 101 may communicate with a BNG 103 through an access node (AN) 102. Further, the user equipment 101 may access a network through the BNG 103. In some embodiments, a function of the BNG is similar to that of a broadband remote access server (BRAS). In some embodiments, there may be no other device between the access node 102 and the BNG 103. In some embodiments, there may be an aggregation node between the access node 102 and the BNG 103.

Figure 2:
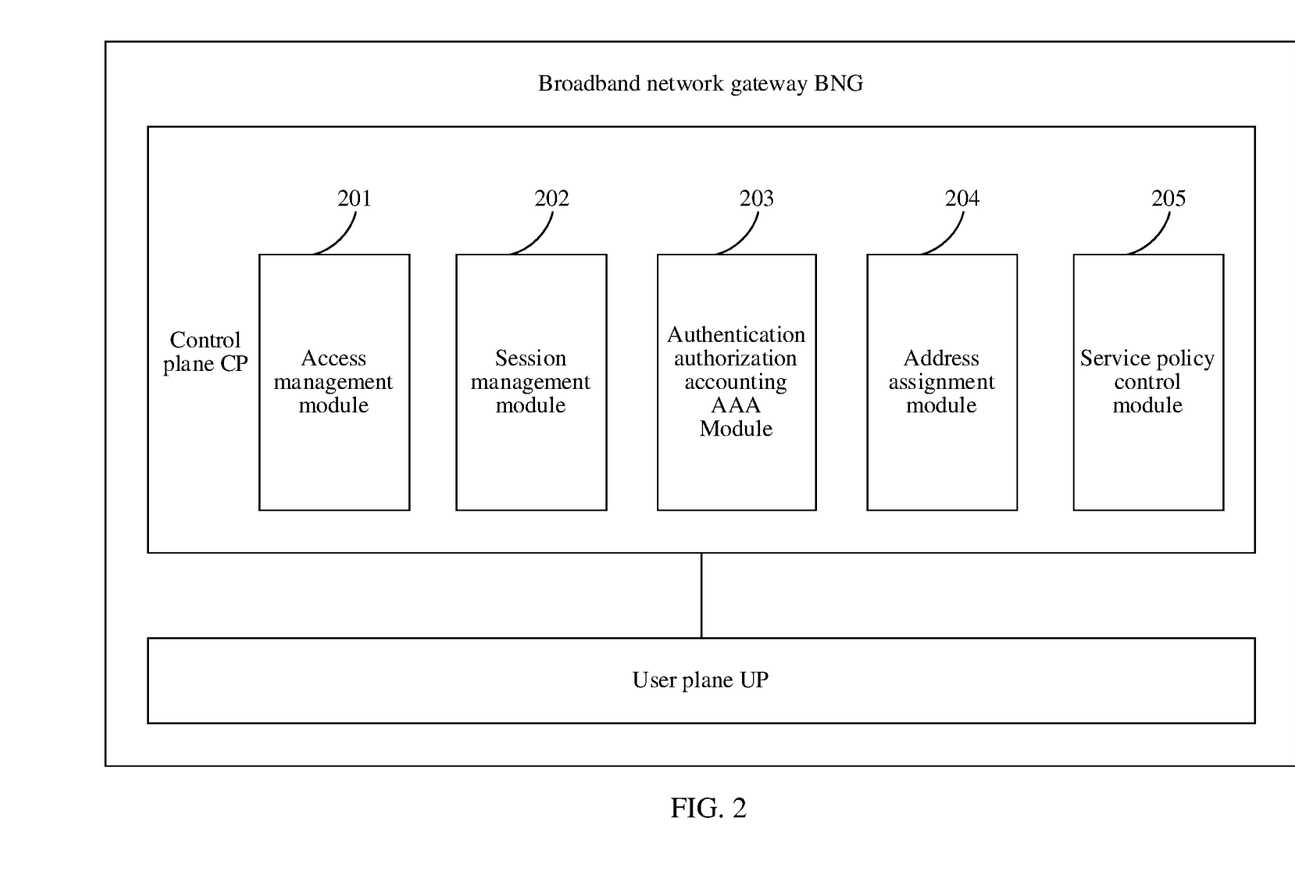
FIG. 2 is a schematic diagram depicting a structure of a BNG according to an embodiment.

When the user equipment 101 accesses the network through the BNG 103, the BNG 103 may perform identity authentication on the user equipment 101, and assign an Internet Protocol (IP) address to the user equipment 101. Refer to FIG. 2 for a better understanding. FIG. 2 is a schematic diagram depicting a structure of a BNG according to an embodiment.

The BNG shown in FIG. 2 may include an access management module 201, a session management module 202, an authentication authorization accounting (AAA) management module 203, an address assignment module 204, and a service policy control module 205.

The access management module 201 and the session management module 202 are configured to process a request message from user equipment. The AAA management module 204 is configured to authenticate the user equipment and obtain information such as a service level agreement (SLA) of the user equipment. The address assignment module 204 is configured to assign an IP address to the user equipment. The service policy control module 205 is configured to determine quality of service (QoS) of the user equipment.

The access management module 201, the session management module 202, the AAA management module 203, the address assignment module 204, and the service policy control module 205 belong to a control plane (CP) of the BNG. The control plane may also be referred to as a control plane.

The BNG shown in FIG. 2 may further include a user plane (UP) 207. The user plane may also be referred to as a forwarding plane. The user plane includes a function module configured to implement data forwarding and a function module interacting with the control plane, for example, includes a routing control module, a forwarding control module, and the like.

In an example, the user equipment may send a request message to the BNG. The request message is used by the user equipment to request to access a network. After receiving the request message, the forwarding plane of the BNG sends the request message to the access management module 201 of the control plane. The access management module 201 and the session management module 202 of the control plane process the received request message. After the AAA management module 203 performs identity authentication on the user equipment, the address assignment module 204 assigns an IP address to the user equipment. After the address assignment module 204 assigns the IP address to the user equipment, the access management module 201 sends the IP address to the user plane, and the user plane sends the IP address to the user equipment.

In addition, the control plane further needs to deliver a network segment route corresponding to the IP address to the user plane, and the user plane sends the network segment route to another forwarding device in the network, for example, to a network device of a core network, so that the network device that receives the network segment route may forward data to the user equipment through the network segment route.

With development of network technologies, the control plane of the BNG may be separated from the BNG, and deployed on another device, for example, on a control and management device or a server. In other words, the control plane and the user plane of the BNG are separated, which is briefly referred to as CU separation. In a scenario with CU separation, the control plane that is separated from the BNG and deployed on another device may also be referred to as a virtual broadband network gateway control plane (vBNG CP) module. In the scenario with CU separation, one vBNG CP module may correspond to a plurality of BNGs. In other words, one vBNG CP module may process request messages that are from the plurality of BNGs and that are used by user equipments to request to access the network, and assign, based on the request messages, IP addresses to the user equipments corresponding to the request messages.

A function of the vBNG CP module is similar to a function of the control plane of the BNG. Therefore, reference may be made to the foregoing description of the control plane of the BNG, and details are not described herein again.

An interaction between the vBNG CP module and the BNG is actually an interaction between the vBNG CP module and the UP of the BNG. For details, reference may be made to the foregoing description of the interaction between the control plane and the user plane of the BNG, and the details are not described herein again.

In some network scenarios, one user equipment may correspond to two gateways, one gateway being a primary gateway, and the other being a backup gateway. When the primary gateway is available, the user equipment accesses the network through the primary gateway. When the primary gateway is unavailable, the user equipment accesses the network through the backup gateway. For example, for a first BNG and a second BNG that are in a primary and backup relation, the primary gateway of a first user is the first BNG, the backup gateway of the first user is the second BNG, the primary gateway of a second user is the second BNG, and the backup gateway of the second user is the first BNG. In this case, the first BNG and the second BNG share one network segment, for example, share a network segment 1. A control plane of the first BNG assigns, based on the network segment 1, an IP address to user equipment that uses the first BNG as a primary gateway, and a control plane of the second BNG assigns, based on the network segment 1, an IP address to user equipment that uses the second BNG as a primary gateway.

In the case in which the first BNG and the second BNG share the network segment 1, if the first BNG first enables the user equipment to access the network, a network resource of the first BNG is improperly occupied. If the second BNG first enables the user equipment to access the network, a network resource of the second BNG is improperly occupied. The following uses an example in which the first BNG first enables the user equipment to access the network for description:

For user equipment A that uses the first BNG as a primary route, after the first BNG receives an access request from the user equipment A, the control plane of the first BNG assigns an IP address to the user equipment A based on the network segment 1. Correspondingly, a forwarding plane of the first BNG may advertise a route 1 corresponding to the network segment 1 to another device as a primary route to the user equipment A. A forwarding path indicated by the route 1 passes through the first BNG. A forwarding plane of the second BNG may advertise a route 2 corresponding to the network segment 1 to the other devices as a backup route to the user equipment A, and a forwarding path indicated by the route 2 passes through the second BNG.

After the user equipment A accesses the network through the first BNG, if user equipment B that uses the second BNG as a primary route requests to access the network, the control plane of the second BNG assigns an IP address to the user equipment B based on the network segment 1. In this case, the primary and backup routes corresponding to network segment 1 have been advertised. Therefore, if another device in the network is to send a packet to the user equipment B, the another device first sends the packet to the first BNG. After parsing the packet and determining that the primary gateway of the user equipment B is the second BNG, the first BNG forwards the packet to the second BNG. The second BNG forwards the packet to the user equipment B. It can be understood that the packet sent by the network device to the user equipment B is forwarded to the second BNG that is the primary gateway of the user equipment B through the first BNG that is the backup gateway of the user equipment B, and the network resource of the first BNG is improperly occupied.

In the foregoing examples, the control plane of the first BNG may run on the first BNG, in other words, CU separation is not implemented; or the control plane of the first BNG may run on another device, in other words, CU separation is implemented. In the scenario with CU separation, the control plane of the second BNG and the control plane of the first BNG may correspond to a same vBNG CP module.

It should be noted that, in the scenario with CU separation, for example, the forwarding plane of the first BNG may receive the IP address of the user equipment from the vBNG CP module, and advertise the route 1 corresponding to the network segment 1 to another device as a primary route to the user equipment A. Correspondingly, the forwarding plane of the second BNG may advertise the route 2 corresponding to the network segment 1 to another device as a backup route to the user equipment A.

To resolve the foregoing problem that the network resource of the first BNG is improperly occupied, an embodiment may provide an access control method. The following describes the method with reference to the accompanying drawings.

The user equipment mentioned in the embodiments may include a mobile terminal such as a smartphone or a tablet computer or may include a terminal device such as a personal computer or a smart television. This is not limited in the embodiments.

Figure 3:
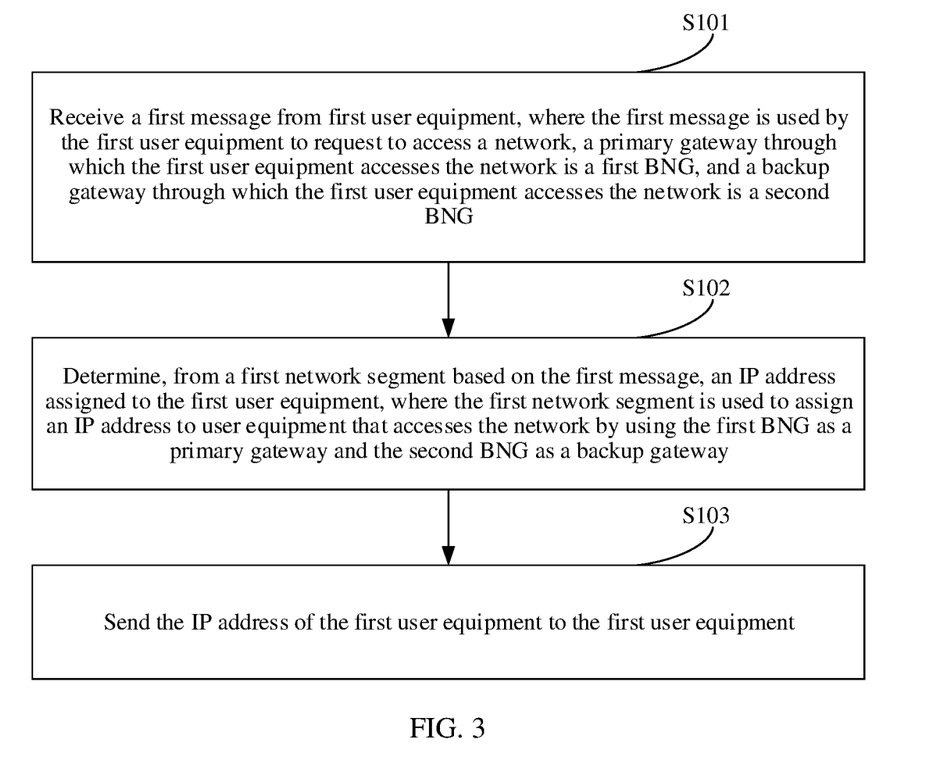
FIG. 3 is a schematic flowchart of an access control method according to an embodiment.

FIG. 3 is a schematic flowchart of an access control method according to an embodiment.

The method shown in FIG. 3 may be performed by a BNG CP. In a scenario without CU separation, the BNG CP may run on a BNG. In a scenario with CU separation, the BNG CP may be a vBNG CP module running on another device independent of the BNG. The method may include, for example, the following steps.

S101: Receive a first message from first user equipment, where the first message is used by the first user equipment to request to access a network, a primary gateway through which the first user equipment accesses the network is a first BNG, and a backup gateway through which the first user equipment accesses the network is a second BNG.

In some embodiments, the first user equipment may send the first message to the BNG CP through a residential gateway (RG) and an access node. In the scenario with CU separation, the first user equipment may send the first message to the RG, the RG sends the first message to the AN, the AN sends the first message to the BNG, and the BNG sends the first message to the vBNG CP module. In the scenario without CU separation, the first user equipment may send the first message to the RG, the RG sends the first message to the AN, the AN sends the first message to an UP of the BNG, and the UP of the BNG sends the first message to the BNG CP.

In the embodiments, the first message is used by the first user equipment to request to access the network. The first message may be a point to point protocol over ethernet (PPPoE) packet or may be an Internet Protocol over ethernet (IPoE) packet. This is not limited in embodiments.

In the embodiments, gateways used by the first user equipment to access the network include a first BNG and a second BNG. The first BNG is a primary gateway through which the first user equipment accesses the network, and the second BNG is a backup gateway through which the first user equipment accesses the network. In some embodiments, the first user equipment may send the first message to a BNG CP of the first BNG and a BNG CP of the second BNG, and the BNG CP of the first BNG and the BNG CP of the second BNG respectively determine whether the BNG CP of the first BNG and the BNG CP of the second BNG are the primary gateway or the backup gateway of the first user equipment. In an example, the BNG CP of the first BNG and the BNG CP of the second BNG may respectively determine, based on a media access control (MAC) address of the first user equipment, whether the BNG CP of the first BNG and the BNG CP of the second BNG are the primary gateway or the backup gateway of the first user equipment. In another example, the BNG CP of the first BNG and the BNG CP of the second BNG may respectively determine, based on a user identifier of the first user equipment, whether the BNG CP of the first BNG and the BNG CP of the second BNG are the primary gateway or the backup gateway of the first user equipment.

In the embodiments, S101 to S103 are performed by the BNG CP of the primary gateway of the first user equipment, in other words, performed by the BNG CP of the first BNG. In a case with CU separation, S101 to S103 are performed by a vBNG CP module, and the vBNG CP module runs on a device independent of the first BNG. In a case without CU separation, S102 and S103 are performed by the BNG CP of the first BNG.

S102: Determine, from a first network segment based on the first message, an IP address assigned to first user equipment, where the first network segment is used to assign an IP address to user equipment that accesses the network by using the first BNG as a primary gateway and the second BNG as a backup gateway.

After receiving the first message, the BNG CP of the first BNG may assign the IP address to the first user equipment. In the embodiments, to prevent a network resource of one of the first BNG and the second BNG from being improperly occupied because the first BNG and the second BNG share a network segment, in the embodiments, the first BNG and the second BNG no longer share a same network segment, but instead, a network segment is associated with the primary gateway and the backup gateway. When the first BNG is the primary gateway and the second BNG is the backup gateway, the first network segment is used. The first network segment is only used to assign an IP address to user equipment that uses the first BNG as a primary gateway and the second BNG as a backup gateway. In other words, the first network segment is no longer used to assign an IP address to user equipment that uses the first BNG as a backup gateway and the second BNG as a primary gateway. In an example, another network segment different from the first network segment may be used to assign an IP address to user equipment that uses the first BNG as a backup gateway and the second BNG as a primary gateway. For example, a third network segment is used to assign an IP address to the user equipment that uses the first BNG as a backup gateway and the second BNG as a primary gateway.

In an implementation of the embodiments, the BNG CP of the first BNG may determine the first network segment based on a predetermined correspondence between a primary gateway, a backup gateway, and a network segment, and further determine, from the first network segment, the IP address assigned to the first user equipment. The correspondence includes at least a correspondence between the first BNG, the second BNG, and the first network segment.

S103: Send the IP address of the first user equipment to the first user equipment.

After determining the IP address assigned to the first user equipment, the BNG CP of the first BNG may send the IP address of the first user equipment to the first user equipment, so that the first user equipment accesses the network based on the IP address. The IP address of the first user equipment mentioned herein is the IP address assigned to the first user equipment determined by the BNG CP of the first BNG in S102.

In the embodiments, if the BNG CP is the virtual BNG CP module, that is, in the scenario with CU separation, the virtual BNG CP module may send the IP address of the first user equipment to the first user equipment through the first BNG. In other words, the virtual BNG CP module may send the IP address of the first user equipment to the first BNG, and after receiving the IP address of the first user equipment, the first BNG may send the IP address of the first user equipment to the first user equipment.

In addition, the first BNG may further advertise a route corresponding to the first network segment to another network device as a primary route to the first user equipment, so that the another network device sends data to the first user equipment through the route. Correspondingly, the second BNG may advertise the route corresponding to the first network segment to the another network device as a backup route to the first user equipment.

It can be understood from the foregoing description that, because the first BNG and the second BNG no longer share the same network segment, the first network segment may be used to assign an IP address to user equipment that uses the first BNG as a primary gateway and the second BNG as a backup gateway; and the third network segment may be used to assign an IP address to user equipment that uses the first BNG as a backup gateway and the second BNG as a primary gateway. In other words, when the first BNG first enables the first user equipment to access the network, a route advertised by the first BNG is the route corresponding to the first network segment. When the second BNG enables user equipment, for example, the third user equipment, to access the network, a route advertised by the second BNG is a route corresponding to the third network segment, not the route corresponding to the first network segment as in the conventional technology. Therefore, to send a packet to the third user equipment, the network device may send the packet to the third user equipment through the second BNG, and the packet does not need to be forwarded to the first BNG and then forwarded to the second BNG by the first BNG, thereby preventing the network resource of the first BNG from being improperly occupied.

In the embodiments, in a case with CU separation, the first BNG and the second BNG may correspond to a same vBNG CP module. If S101 to S103 are performed by the vBNG CP module, the vBNG CP may further assign an IP address to third user equipment. The third user equipment is user equipment that accesses the network by using the second BNG as a primary gateway and the first BNG as a backup gateway. In an example, the vBNG CP module may receive a third message from the third user equipment, and determine, from the third network segment, the IP address assigned to the third user equipment. After determining the IP address assigned to the third user equipment, the vBNG CP module may send the IP address of the third user equipment to the third user equipment.

An implementation principle of receiving the third message from the third user equipment by the vBNG CP module is similar to an implementation principle of receiving the first message from the first user equipment by the vBNG CP module. Therefore, for an implementation of receiving the third message from the third user equipment by the vBNG CP module, reference may be made to the foregoing description of S101, and details are not described herein again.

For the third network segment, reference may be made to the description of the third network segment in S102, and details are not described herein again.

After determining, from the third network segment, the IP address assigned to the third user equipment, the vBNG CP module may send the IP address of the third user equipment to the third user equipment through the second BNG. In other words, the virtual BNG CP module may send the IP address of the third user equipment to the second BNG, and after receiving the IP address of the third user equipment, the second BNG may send the IP address of the third user equipment to the third user equipment.

In addition, the second BNG may further advertise a route corresponding to the third network segment to another network device as a primary route to the third user equipment, so that the another network device sends data to the third user equipment through the route. In addition, the first BNG may advertise the route corresponding to the third network segment to the another network device as a backup route to the third user equipment.

In some embodiments, the first BNG may form a primary and backup relation with a plurality of BNGs. For example, as described above, the first BNG and the second BNG may form a primary and backup relation. For another example, the first BNG and the third BNG may also form a primary and backup relation. To avoid improper occupation of network resources of BNGs, in the embodiments, a second network segment may be used to assign an IP address to user equipment that uses the first BNG as a primary gateway and the third BNG as a backup gateway. The first network segment, the second network segment, and the third network segment are different from each other. In this case, the BNG CP of the first BNG may further assign an IP address to second user equipment. In an example, the BNG CP of the first BNG may receive a second message from the second user equipment, and determine, from the second network segment, the IP address assigned to the second user equipment. After determining the IP address assigned to the second user equipment, the BNG CP of the first BNG may send the IP address of the second user equipment to the second user equipment.

An implementation principle of receiving the second message from the second user equipment by the BNG CP of the first BNG is similar to an implementation principle of receiving the first message from the first user equipment by the BNG CP of the first BNG. Therefore, for an implementation of receiving the second message from the second user equipment by the BNG CP of the first BNG, reference may be made to the foregoing description of S101, and details are not described herein again.

After determining, from the second network segment, the IP address assigned to the second user equipment, the BNG CP of the first BNG may send the IP address of the second user equipment to the second user equipment through the first BNG. In other words, the virtual BNG CP module may send the IP address of the second user equipment to the first BNG, and after receiving the IP address of the second user equipment, the first BNG may send the IP address of the second user equipment to the second user equipment.

In addition, the first BNG may further advertise a route corresponding to the second network segment to another network device as a primary route to the second user equipment, so that the another network device sends data to the second user equipment through the route. In addition, the third BNG may advertise the route corresponding to the second network segment to the another network device as a backup route to the second user equipment.

The access control method provided in the embodiments is described above. The following describes the method provided in the embodiments with reference to an application scenario.

Figure 4:
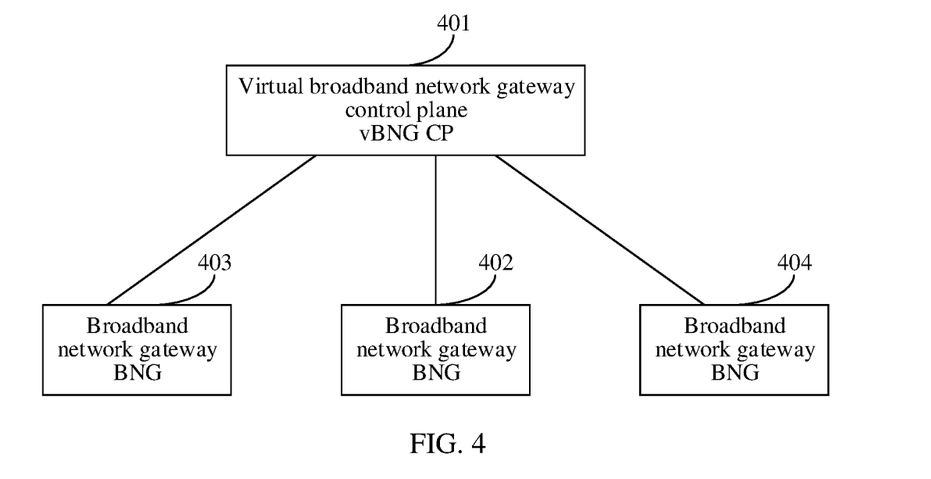
FIG. 4 is a schematic diagram of an example application scenario according to an embodiment.

FIG. 4 is a schematic diagram of an example application scenario according to an embodiment. In the scenario shown in FIG. 4, CU separation is implemented, and a vBNG CP module 401 runs on a network management device. The vBNG CP module 401 corresponds to a plurality of BNGs. As shown in FIG. 4, the vBNG CP module 401 corresponds to a BNG 402, a BNG 403, and a BNG 404.

In the scenario shown in FIG. 4, the BNG 402 and the BNG 403 are in a primary and backup relation, and the BNG 402 and the BNG 404 are in a primary and backup relation. The vBNG CP module 401 pre-stores a correspondence shown in Table 1 below.

TABLE 1

| Primary gateway | Backup gateway | Network segment |
| --- | --- | --- |
| BNG 402 | BNG 403 | Network segment 1 |
| BNG 402 | BNG 404 | Network segment 2 |
| BNG 403 | BNG 402 | Network segment 3 |

With respect to Table 1, it should be noted that, the network segment 1 is used to assign an IP address to user equipment that accesses a network by using the BNG 402 as a primary gateway and the BNG 403 as a backup gateway; the network segment 2 is used to assign an IP address to user equipment that accesses the network by using the BNG 402 as a primary gateway and the BNG 404 as a backup gateway; and the network segment 3 is used to assign an IP address to user equipment that accesses the network by using the BNG 403 as a primary gateway and the BNG 404 as a backup gateway.

The vBNG CP module 401 may perform the access control method provided in the embodiments, to assign an IP address to user equipment that accesses the network through the BNG 402 or the BNG 403. When the vBNG CP module 401 may perform the access control method provided in the embodiments, the BNG 402 may correspond to the first BNG in the foregoing embodiments, the BNG 403 may correspond to the second BNG in the foregoing embodiments, and the BNG 404 may correspond to the third BNG in the foregoing embodiments. The network segment 1 may correspond to the first network segment in the foregoing embodiments, the network segment 2 may correspond to the second network segment in the foregoing embodiments, and the network segment 3 may correspond to the third network segment in the foregoing embodiments.

Based on the access control method provided in the foregoing embodiments, an embodiment may further provide a corresponding apparatus, which is described below with reference to the accompanying drawings.

Figure 5:
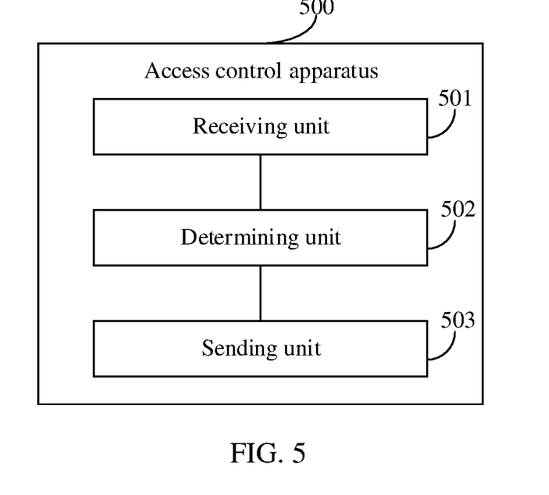
FIG. 5 is a schematic diagram depicting a structure of an access control apparatus according to an embodiment.

FIG. 5 is a schematic diagram depicting a structure of an access control apparatus according to an embodiment. The access control apparatus 500 shown in FIG. 5 may be, for example, used in a BNG CP, and is configured to perform the access control method performed by the BNG CP in the foregoing method embodiments. As shown in FIG. 5, the access control apparatus 500 includes: a receiving unit 501, a determining unit 502, and a sending unit 503.

The receiving unit 501 is configured to receive a first message from first user equipment, where the first message is used by the first user equipment to request to access a network, a primary gateway through which the first user equipment accesses the network is a first BNG, and a backup gateway through which the first user equipment accesses the network is a second BNG.

The determining unit 502 is configured to determine, from a first network segment based on the first message, an Internet Protocol (IP) address assigned to the first user equipment, where the first network segment is used to assign an IP address to user equipment that accesses the network by using the first BNG as a primary gateway and the second BNG as a backup gateway, and the first network segment is not used to assign an IP address to user equipment that uses the first BNG as a backup gateway and the second BNG as a primary gateway.

The sending unit 503 is configured to send the IP address of the first user equipment to the first user equipment.

In an implementation, the receiving unit 501 is further configured to receive a second message from second user equipment, where the second message is used by the second user equipment to request to access the network, a primary gateway through which the second user equipment accesses the network is the first BNG, and a backup gateway through which the second user equipment accesses the network is a third BNG.

The determining unit 502 is further configured to determine, from a second network segment based on the second message, an IP address assigned to the second user equipment, where the second network segment is used to assign an IP address to user equipment that accesses the network by using the first BNG as a primary gateway and the third BNG as a backup gateway, and the first network segment is different from the second network segment.

The sending unit 503 is further configured to send the IP address of the second user equipment to the second user equipment.

In an implementation, the BNG CP is a virtual BNG CP module, or the BNG CP runs on the first BNG.

In an implementation, when the BNG CP is the virtual BNG CP module,
   the receiving unit 501 is further configured to receive a third message from third user equipment, where the third message is used by the third user equipment to request to access the network, a primary BNG through which the third user equipment accesses the network is the second BNG, and a backup BNG through which the third user equipment accesses the network is the first BNG.

The determining unit 502 is further configured to determine, from a third network segment based on the third message, an IP address assigned to the third user equipment, where the third network segment is used to assign an IP address to user equipment that accesses the network by using the second BNG as a primary gateway and the first BNG as a backup gateway, the first network segment, the second network segment, and the third network segment are different from each other, and the second network segment is used to assign an IP address to user equipment that accesses the network by using the first BNG as a primary gateway and the third BNG as a backup gateway.

The sending unit 503 is further configured to send the IP address of the third user equipment to the third user equipment.

In an implementation, the apparatus further includes: an obtaining unit.

The obtaining unit is configured to obtain a correspondence between a primary gateway, a backup gateway, and a network segment, where the correspondence includes one or more of the following:
   a correspondence between the first BNG, the second BNG, and the first network segment;
   a correspondence between the first BNG, the third BNG, and the second network segment; and
   a correspondence between the second BNG, the first BNG, and the third network segment.

In an implementation, when the BNG CP is a virtual BNG CP module, the sending unit 503 is configured to:
   send the IP address of the first user equipment to the first user equipment through the first BNG.

In an implementation, when the BNG CP runs on the first BNG, the sending unit 503 is further configured to:
   advertise a route corresponding to the first network segment to another network device as a primary route to the first user equipment, where the route corresponding to the first network segment is a route to the first user equipment through the first BNG.

The apparatus 500 is an apparatus corresponding to the access control method provided in the foregoing method embodiments. Implementations of units of the apparatus 500 and the foregoing method embodiments belong to a same conception. Therefore, for implementations of the units of the apparatus 500, reference may be made to the description of the access control method in the foregoing method embodiments, and details are not described herein again.

Figure 6:
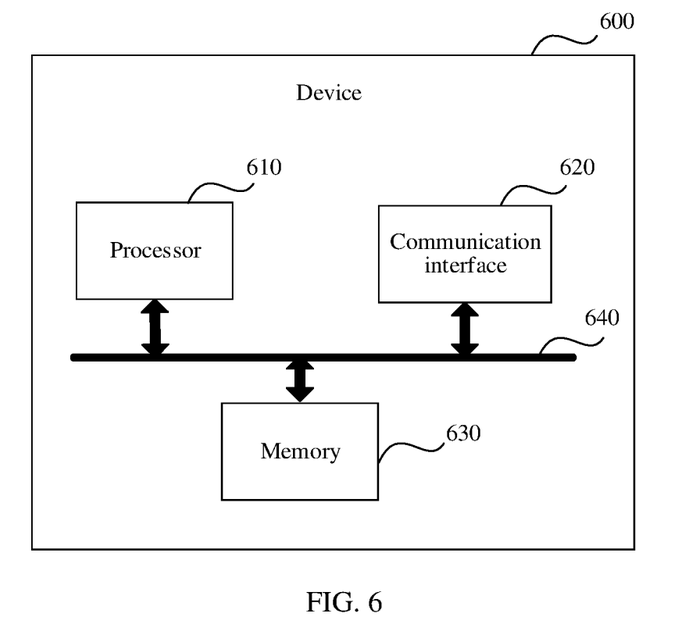
FIG. 6 is a schematic diagram depicting a structure of a device according to an embodiment.

It should be noted that, a hardware structure of the access control apparatus 500 mentioned above may be a structure shown in FIG. 6. FIG. 6 is a schematic diagram depicting a structure of a device according to an embodiment.

The device 600 includes: a processor 610, a communication interface 620, and a memory 630. The device 600 may include one or more processors 610. In FIG. 6, one processor is used as an example. In the embodiments, the processor 610, the communication interface 620, and the memory 630 may be connected through a bus system or in another manner. In FIG. 6, for example, a bus system 640 is used for connection.

The processor 610 may be a central processing unit (CPU), a network processor (NP), or a combination of a CPU and an NP. The processor 610 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 630 may include a volatile memory, for example, a random access memory (RAM). The memory 630 may also include a non-volatile memory, for example, a flash memory, a hard disk drive (HDD), or a solid-state drive (SSD). The memory 630 may further include a combination of the foregoing types of memories. The memory 630 may store, for example, the correspondence between the primary gateway, the backup gateway, and the network segment.

Optionally, the memory 630 stores an operating system and a program, an executable module, or a data structure, a subset thereof, or an extended set thereof. The program may include various operation instructions for implementing various operations. The operating system may include various system programs, to implement various basic services and process a hardware-based task. The processor 610 may read the program stored in the memory 630, to implement the access control method provided in the embodiments.

The bus system 640 may be a peripheral component interconnect (PCI) bus, an extended industry standard architecture (EISA) bus, or the like. The bus system 640 may be classified into an address bus, a data bus, a control bus, and the like. For ease of description, in FIG. 6, only one bold line is used for description, but which does not indicate that there is only one bus or only one type of bus.

The embodiments may further provide a non-transitory computer-readable storage medium, including instructions or a computer program, and when the instructions or computer program is run on a computer, the computer is enabled to perform the access control method according to the foregoing embodiments.

In the embodiments and accompanying drawings, the terms such as "first", "second", "third", "fourth", and the like (if any) are intended to distinguish between similar objects but do not necessarily indicate an order or sequence. It should be understood that the data used in such a way is interchangeable in appropriate circumstances, so that the embodiments described herein can be implemented in an order other than the content illustrated or described herein. In addition, the terms such as "include", "have", and any variants thereof are intended to cover non-exclusive inclusions. For example, a process, method, system, product, or device that includes a series of steps or units is not necessarily limited to those clearly listed steps or units but may include other steps or units that are not clearly listed or inherent to such a process, method, product, or device.

A person skilled in the art may clearly understand that, for simple and clear description, for work processes of the foregoing described system, apparatus, and unit, reference may be made to corresponding processes in the foregoing method embodiments, and details are not described herein again.

In the several embodiments, it should be understood that the system, apparatus, and method may be implemented in other manners. For example, the described apparatus embodiments are merely examples. For example, division into units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in the embodiments may be integrated into one processing unit, or each of the units may exist alone physically, or two or more units may be integrated into one unit. The integrated unit may be implemented in a form of hardware or may be implemented in a form of a software service unit.

When the integrated unit is implemented in a form of a software service unit and sold or used as an independent product, the integrated unit may be stored in a non-transitory computer-readable storage medium. Based on such an understanding, the embodiments essentially, or a part contributing to a conventional technology may be implemented in a form of a software product. The computer software product is stored in a non-transitory storage medium and includes several instructions for instructing a computer device (which may be a personal computer, a server, a network device, or the like) to perform all or some of the steps of the method in the embodiments. The foregoing storage medium includes any medium that can store program code, such as a USB flash drive, a removable hard disk, a read-only memory (ROM), a random access memory (RAM), a magnetic disk, or an optical disc.

A person skilled in the art should be aware that, in the foregoing one or more examples, services may be implemented by hardware, software, firmware, or any combination thereof. When implemented by the software, the services may be stored in a non-transitory computer-readable medium. The non-transitory storage medium may be any available medium accessible to a general-purpose or a special-purpose computer.

In the foregoing implementations, the objectives, solutions, and beneficial effects are further described in detail. It should be understood that the foregoing descriptions are merely implementations and are non-limiting.

The foregoing embodiments are merely intended for describing instead of limiting. Although described in detail with reference to the foregoing embodiments, it should understand that a person of ordinary skill in the art may still make modifications and not depart from the scope of the embodiments.

What is claimed is:

1. An access control method, performed by a virtual broadband network gateway control plane (vBNG CP) in a virtual broadband network gateway (vBNG) system in which the vBNG CP and a user plane (UP) are separated, the method comprising:
   receiving a first message from first user equipment, wherein the first message is used by the first user equipment to request to access a network, a primary gateway through which the first user equipment accesses the network is a first UP in the vBNG system, and a backup gateway through which the first user equipment accesses the network is a second UP in the vBNG system;
   determining, from a first network segment based on the first message, an Internet Protocol (IP) address assigned to the first user equipment, wherein the first network segment is used to assign the IP address to user equipment that accesses the network by using the first UP as a primary gateway and the second UP as a backup gateway; and sending the IP address of the first user equipment to the first user equipment;
   receiving a second message from second user equipment, wherein the second message is used by the second user equipment to request to access the network, a primary gateway through which the second user equipment accesses the network is the first UP, and a backup gateway through which the second user equipment accesses the network is a third UP in the vBNG system;
   determining, from a second network segment based on the second message, an IP address assigned to the second user equipment, wherein the second network segment is used to assign the IP address to user equipment that accesses the network by using the first UP as a primary gateway and the third UP as a backup gateway, and the first network segment is different from the second network segment; and
   sending the IP address of the second user equipment to the second user equipment.

2. The access control method according to claim 1, wherein the BNG CP is a virtual BNG CP module.

3. The access control method according to claim 2, wherein when the BNG CP is the virtual BNG CP module, the method further comprises:
   receiving a third message from third user equipment, wherein the third message is used by the third user equipment to request to access the network, a primary UP through which the third user equipment accesses the network is the second UP, and a backup UP through which the third user equipment accesses the network is the first UP;
   determining, from a third network segment based on the third message, an IP address assigned to the third user equipment, wherein the third network segment is used to assign the IP address to user equipment that accesses the network by using the second UP as a primary gateway and the first UP as a backup gateway, the first network segment, the second network segment, and the third network segment are different from each other, and the second network segment is used to assign the IP address to user equipment that accesses the network by using the first UP as a primary gateway and the third UP as a backup gateway; and sending the IP address of the third user equipment to the third user equipment.

4. The access control method according to claim 2, wherein when the BNG CP is the virtual BNG CP module and sending the IP address of the first user equipment to the first user equipment further comprises: sending the IP address of the first user equipment to the first user equipment through the first UP.

5. The access control method according to claim 2, wherein, when the BNG CP runs on the first UP, the method further comprises:
   advertising a route corresponding to the first network segment to another network device as a primary route to the first user equipment, wherein the route corresponding to the first network segment is a route to the first user equipment through the first UP.

6. The access control method according to claim 1, further comprising: acquiring a correspondence between a primary gateway, a backup gateway, and a network segment, wherein the correspondence comprises one or more of the following:
   a correspondence between the first UP, the second UP, and the first network segment;
   a correspondence between the first UP, the third UP, and the second network segment; and
   a correspondence between the second UP, the first UP, and the third network segment.

7. An access control apparatus, applied to a virtual broadband network gateway control plane (vBNG CP) in a virtual broadband network gateway (vBNG) system in which the vBNG CP and a user plane (UP) are separated, the apparatus comprising:
   at least one processor;
   one or more memories coupled to the at least one processor and storing programming instructions, wherein the at least one processor is configured to execute the programming instructions to cause the apparatus to:
   receive a first message from first user equipment, wherein the first message is used by the first user equipment to request to access a network, a primary gateway through which the first user equipment accesses the network is a first UP in the vBNG system, and a backup gateway through which the first user equipment accesses the network is a second UP in the vBNG system;
   determine, from a first network segment based on the first message, an Internet Protocol (IP) address assigned to the first user equipment, wherein the first network segment is used to assign the IP address to user equipment that accesses the network by using the first UP as a primary gateway and the second UP as a backup gateway, and the first network segment is not used to assign the IP address to user equipment that uses the first UP as a backup gateway and the second UP as a primary gateway; and send the IP address of the first user equipment to the first user equipment;
   wherein the programming instructions, when executed by the at least one processor, further cause the network device to:
   receive a second message from second user equipment, wherein the second message is used by the second user equipment to request to access the network, a primary gateway through which the second user equipment accesses the network is the first UP, and a backup gateway through which the second user equipment accesses the network is a third UP in the vBNG system;
   determine, from a second network segment based on the second message, an IP address assigned to the second user equipment, wherein the second network segment is used to assign the IP address to user equipment that accesses the network by using the first UP as a primary gateway and the third UP as a backup gateway, and the first network segment is different from the second network segment; and
   send the IP address of the second user equipment to the second user equipment.

8. The access control apparatus according to claim 7, wherein the BNG CP is a virtual BNG CP module.

9. The access control apparatus according to claim 8, wherein when the BNG CP is the virtual BNG CP module, the programming instructions, when executed by the at least one processor, further cause the network device to: receive a third message from third user equipment, wherein the third message is used by the third user equipment to request to access the network, a primary UP through which the third user equipment accesses the network is the second UP, and a backup UP through which the third user equipment accesses the network is the first UP;
   determine, from a third network segment based on the third message, an IP address assigned to the third user equipment, wherein the third network segment is used to assign the IP address to user equipment that accesses the network by using the second UP as a primary gateway and the first UP as a backup gateway, the first network segment, the second network segment, and the third network segment are different from each other, and the second network segment is used to assign the IP address to user equipment that accesses the network by using the first UP as a primary gateway and the third UP as a backup gateway; and
   send the IP address of the third user equipment to the third user equipment.

10. The access control apparatus according to claim 8, wherein when the BNG CP is the virtual BNG CP module, the programming instructions, when executed by the at least one processor, further cause the network device to: send the IP address of the first user equipment to the first user equipment through the first UP.

11. The access control apparatus according to claim 8, wherein when the BNG CP runs on the first UP, the programming instructions, when executed by the at least one processor, further cause the network device to: advertise a route corresponding to the first network segment to another network device as a primary route to the first user equipment, wherein the route corresponding to the first network segment is a route to the first user equipment through the first UP.

12. The access control apparatus according to claim 7, wherein the programming instructions, when executed by the at least one processor, further cause the network device to: obtain a correspondence between a primary gateway, a backup gateway, and a network segment, wherein the correspondence comprises one or more of the following: a correspondence between the first UP, the second UP, and the first network segment; a correspondence between the first UP, the third UP, and the second network segment; and a correspondence between the second UP, the first UP, and the third network segment.

13. A virtual broadband network gateway (vBNG) system, comprising: a virtual broadband network gateway control plane (vBNG CP) implemented on a server device; and
   at least one user plane (UP), wherein the vBNG CP and the at least one UP are separated, wherein the vBNG CP is configured to: receive a first message from first user equipment, wherein the first message is used by the first user equipment to request to access a network, a primary gateway through which the first user equipment accesses the network is a first UP in the vBNG system, and a backup gateway through which the first user equipment accesses the network is a second UP in the vBNG system; determine, from a first network segment based on the first message, an Internet Protocol (IP) address assigned to the first user equipment, wherein the first network segment is used to assign the IP address to user equipment that accesses the network by using the first UP as a primary gateway and the second UP as a backup gateway, and the first network segment is not used to assign the IP address to user equipment that uses the first UP as a backup gateway and the second UP as a primary gateway; and send the IP address of the first user equipment to the first user equipment;

wherein the vBNG CP is further configured to:

receive a second message from second user equipment, wherein the second message is used by the second user equipment to request to access the network, a primary gateway through which the second user equipment accesses the network is the first UP, and a backup gateway through which the second user equipment accesses the network is a third UP in the vBNG system;

determine, from a second network segment based on the second message, an IP address assigned to the second user equipment, wherein the second network segment is used to assign the IP address to user equipment that accesses the network by using the first UP as a primary gateway and the third UP as a backup gateway, and the first network segment is different from the second network segment; and send the IP address of the second user equipment to the second user equipment.

14. The system according to claim 13, wherein the BNG CP is the virtual BNG CP module and the vBNG CP is further configured to:

receive a third message from third user equipment, wherein the third message is used by the third user equipment to request to access the network, a primary UP through which the third user equipment accesses the network is the second UP, and a backup UP through which the third user equipment accesses the network is the first UP;

determine, from a third network segment based on the third message, an IP address assigned to the third user equipment, wherein the third network segment is used to assign the IP address to user equipment that accesses the network by using the second UP as a primary gateway and the first UP as a backup gateway, the first network segment, the second network segment, and the third network segment are different from each other, and the second network segment is used to assign the IP address to user equipment that accesses the network by using the first UP as a primary gateway and the third UP as a backup gateway; and send the IP address of the third user equipment to the third user equipment.

15. The system according to claim 13, wherein the vBNG CP is further configured to: obtain a correspondence between a primary gateway, a backup gateway, and a network segment, wherein the correspondence comprises one or more of the following: a correspondence between the first UP, the second UP, and the first network segment; a correspondence between the first UP, the third UP, and the second network segment; and a correspondence between the second UP, the first UP, and the third network segment.

16. The system according to claim 13, wherein the BNG CP is the virtual BNG CP module and the vBNG CP is further configured to: send the IP address of the first user equipment to the first user equipment through the first UP.

17. The system according to claim 13, wherein, when the BNG CP runs on the first UP, the vBNG CP is further configured to: advertise a route corresponding to the first network segment to another network device as a primary route to the first user equipment, wherein the route corresponding to the first network segment is a route to the first user equipment through the first UP.

* * * * *